(12) United States Patent
Lyst, Jr. et al.

(10) Patent No.: US 9,049,412 B2
(45) Date of Patent: Jun. 2, 2015

(54) SYSTEM AND METHOD FOR PROJECTING VIDEO ONTO A SCREEN

(75) Inventors: James Edward Lyst, Jr., Indianapolis, IN (US); Eugene Murphy O'Donnell, Fishers, IN (US)

(73) Assignee: TTE TECHNOLOGY, INC., Indianapolis, IN (US)

( * ) Notice: Subject to any disclaimer, the term of this patent is extended or adjusted under 35 U.S.C. 154(b) by 2060 days.

(21) Appl. No.: 11/093,862

(22) Filed: Mar. 30, 2005

(65) Prior Publication Data

US 2006/0227086 A1    Oct. 12, 2006

(51) Int. Cl.
| G09G 3/00 | (2006.01) |
| H04N 5/74 | (2006.01) |
| H04N 9/31 | (2006.01) |

(52) U.S. Cl.
CPC .......... *H04N 5/7458* (2013.01); *H04N 9/3114* (2013.01); *H04N 9/315* (2013.01)

(58) Field of Classification Search
USPC .......... 345/84, 89; 359/618; 353/31; 348/758
See application file for complete search history.

(56) References Cited

U.S. PATENT DOCUMENTS

| 3,971,931 | A |   | 7/1976 | Jehle |
| 5,777,696 | A | * | 7/1998 | Inoue et al. ................... 348/752 |
| 6,639,631 | B1 |  | 10/2003 | Hall, Jr. et al. |
| 6,704,758 | B1 |  | 3/2004 | O'Donnell |
| 6,711,597 | B1 |  | 3/2004 | O'Donnell |
| 6,747,710 | B2 |  | 6/2004 | Hall, Jr. et al. |
| 6,755,536 | B2 |  | 6/2004 | Tegreene et al. |
| 6,837,584 | B2 |  | 1/2005 | Drazic et al. |
| 6,843,591 | B1 | * | 1/2005 | Peng et al. .................... 362/560 |
| 7,128,423 | B2 | * | 10/2006 | Imade et al. .................... 353/94 |
| 7,210,815 | B2 | * | 5/2007 | Imade .......................... 362/234 |
| 2003/0001811 | A1 |  | 1/2003 | O'Donnell |
| 2003/0020724 | A1 |  | 1/2003 | O'Donnell |
| 2003/0098835 | A1 |  | 5/2003 | O'Donnell et al. |
| 2003/0103171 | A1 |  | 6/2003 | Hall, Jr. et al. |
| 2003/0103193 | A1 |  | 6/2003 | O'Donnell et al. |
| 2003/0132894 | A1 |  | 7/2003 | O'Donnell et al. |
| 2003/0214637 | A1 |  | 11/2003 | Drazic et al. |

(Continued)

FOREIGN PATENT DOCUMENTS

| EP | 0 790 515 | 8/1997 |
| EP | 1 398 659 | 3/2004 |

(Continued)

OTHER PUBLICATIONS

PCT International Bureau; PCT International Preliminary Report on Patentability, Oct. 11, 2007, Geneva, Switzerland.

(Continued)

*Primary Examiner* — Yong H Sim
(74) *Attorney, Agent, or Firm* — Fletcher Yoder P.C.

(57) ABSTRACT

The disclosed embodiments relate to a system and method for projecting video onto a screen. A video unit (10) may comprise a plurality of light emitting diodes (40a, 40b, and 40c) disposed in an annular formation (41) and configured to produce light (44), a reflector configured to reflect the produced light from at least one of the plurality of light emitting diodes (40a, 40b, and 40c), and a plurality of optical components disposed in an annular formation, wherein each of the optical components corresponds to one of the light emitting diodes (40a, 40b, and 40c), wherein each of the optical components is configured to focus the produced light at the reflector.

23 Claims, 3 Drawing Sheets

(56) References Cited

U.S. PATENT DOCUMENTS

| | | |
|---|---|---|
| 2004/0027321 A1 | 2/2004 | O'Donnell |
| 2004/0036665 A1 | 2/2004 | O'Donnell |
| 2004/0051815 A1 | 3/2004 | Alpaiwalia et al. |
| 2004/0062044 A1* | 4/2004 | Hanano ......................... 362/317 |
| 2004/0165157 A1 | 8/2004 | Childers et al. |
| 2004/0174525 A1 | 9/2004 | Mullani |
| 2004/0189956 A1 | 9/2004 | Kanayama et al. |
| 2004/0202003 A1 | 10/2004 | Lyst, Jr. |
| 2005/0002169 A1 | 1/2005 | Drazic et al. |
| 2005/0017938 A1 | 1/2005 | O'Donnell et al. |
| 2005/0046759 A1 | 3/2005 | O'Donnell et al. |
| 2005/0128441 A1* | 6/2005 | Morgan ......................... 353/102 |
| 2006/0164600 A1* | 7/2006 | Morejon et al. ................. 353/31 |

FOREIGN PATENT DOCUMENTS

| | | |
|---|---|---|
| EP | 1 508 740 | 2/2005 |
| JP | 2002365488 A | 12/2002 |
| WO | WO 2005/060584 | 7/2005 |

OTHER PUBLICATIONS

EP Office Action for EP Application No. 06717813.7 dated Jan. 26, 2010.

* cited by examiner

SYSTEM AND METHOD FOR PROJECTING VIDEO ONTO A SCREEN

FIELD OF THE INVENTION

The present invention relates generally to projecting video images onto a screen. More specifically, the present invention relates to a system and method for projecting video images using multiple light emitting diodes.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Projection televisions create video images by varying the color and shade of projected light. One example of a projection television system is a Digital Light Processing ("DLP") system. DLP systems employ an optical semiconductor, known as a Digital Micromirror Device ("DMD") to project video onto a screen. DMDs typically contain an array of at least one million or more microscopic mirrors mounted on microscopic hinges. Each of these mirrors is associated with a point on the screen, known as a pixel. By varying the amount of light that is reflected off each of these mirrors, it is possible to project video images onto the screen.

Specifically, by electrically actuating each of these hinge-mounted microscopic mirrors, it is possible to either illuminate a point on the screen (i.e., "turn on" a particular micromirror) or to leave that particular point dark by reflecting the light somewhere else besides the screen (i.e., "turn off" the micromirror). Further, by varying the amount of time a particular micromirror is turned on, it is possible to create a variety of gray shades. For example, if a micromirror is turned on for longer than it is turned off, the pixel that is associated with that particular micromirror, will have a light gray color; whereas if a particular micromirror is turned off more frequently than it is turned on, that particular pixel will have a darker gray color. In this manner, video can be created by turning each micromirror on or off several thousand times per second. Moreover, by shining colored light at the micromirrors instead of white light, it is possible to generate millions of shades or color instead of shades of gray.

Conventionally, there are two main techniques to produce the light used in a projection television or video projector. First, the light may be created by a conventional lamp, such as an incandescent lamp or a halogen lamp. Second, the light may be produced by one or more light emitting diodes ("LEDs"). There are many advantages to using LEDs instead of incandescent or halogen lamps. Specifically, LEDs are solid state components, and thus are typically more robust and more efficient than incandescent or halogen lamps, because they operate at lower temperatures. Moreover, because LEDs can generate specific colors of light, projection televisions employing LEDs do not use a color wheel. Unfortunately, a single LED cannot presently produce enough light to continuously project large video images, and conventional techniques for harnessing the light from multiple LEDs are extremely inefficient. An efficient method for harnessing light from multiple LEDs to project a video image is desirable.

SUMMARY OF THE INVENTION

The disclosed embodiments relate to a system and method for projecting video onto a screen. A video unit (10) may comprise a plurality of light emitting diodes (40a, 40b, and 40c) disposed in an annular formation (41) and configured to produce light (44), a plurality of optical components disposed in an annular formation, wherein each of the optical components corresponds to one of the light emitting diodes (40a, 40b, and 40c), and a reflector configured to reflect light from at least one of the plurality of light emitting diodes (48), wherein each of the optical components is configured to focus the produced light at the reflector.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
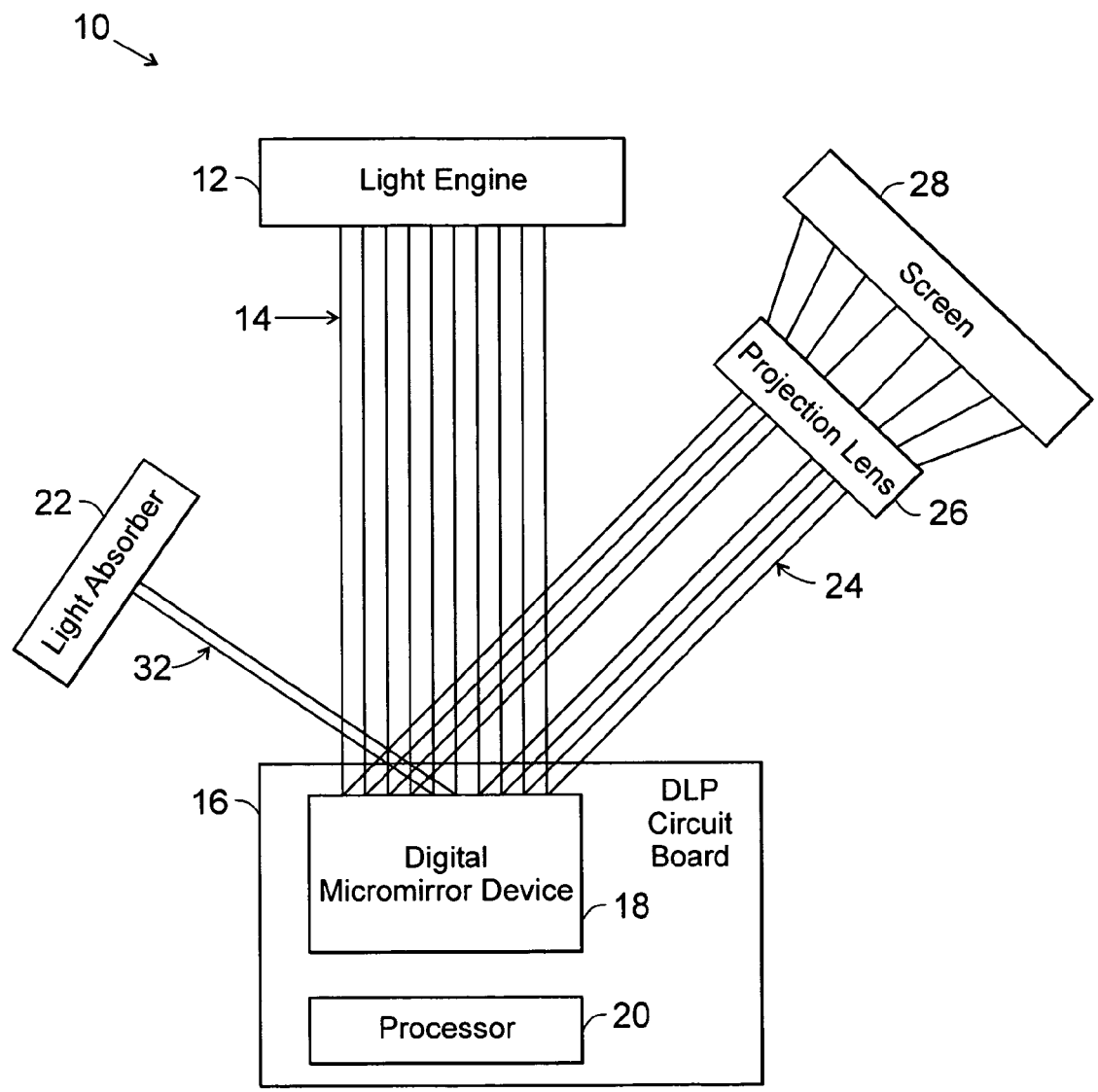
FIG. 1 is a block diagram of a video unit employing an LED light engine in accordance with embodiments of the present invention.

FIG. 1 is a block diagram of a video unit 10 employing a Light Emitting Diode ("LED") light engine 12 in accordance with embodiments of the present invention. In one embodiment, the video unit 10 comprises a Digital Light Processing ("DLP") projection television. In another embodiment, the video unit 10 may comprise a DLP-based video or movie projector. In still another embodiment, the video unit 10 may comprise another form of projection television.

The LED light engine 12 comprises multiple LEDs that are configured to project, shine, or focus colored light 14 at a digital micromirror device ("DMD") 18. In alternate embodiments, such as a black and white video system or a color wheel based system, the LED light engine 12 may be configured to produce a single color of light. As will be described in greater detail below in regard to FIGS. 2, 3, and 4, embodiments of the present invention enable multiple LEDs within the LED light engine 12 to be efficiently employed in combination with each other to create light to project large video images.

As illustrated, the LED light engine 12 projects, shines, or focuses colored light 14 at the DMD 18. The DMD 18 may be located on a digital light processing ("DLP") circuit board 16 arrayed within an optical line of sight of the LED light engine 12. The DLP circuit board 16 may comprise the DMD 18 and a processor 20. As described above, the DMD 18 may comprise up to one million or more micromirrors mounted on microscopic, electrically-actuated hinges that enable the micromirrors to tilt between a turned on position and turned off position. In the illustrated embodiment, the DMD 18 is coupled to the processor 20. In one embodiment, the processor 20 receives a video input and directs the micromirrors on the DMD 18 to turn on or off, as appropriate to create the video image. In alternate embodiments the processor 20 may be located elsewhere in the video unit 10.

The colored light 14 that reflects off a turned on micromirror (identified by a reference numeral 24) is reflected to a projecting lens 26 and then projected on to a screen 28 for viewing. On the other hand, the colored light 14 that reflects off of a turned off micromirror (identified by a reference numeral 30) is directed somewhere else in the video unit 10 besides the screen 28, such as a light absorber 22. In this way, the pixel on the screen 28 that corresponds to a turned off micromirror does not receive the projected colored light 14 while the micromirror is turned off.

In one embodiment, the colored light 14 from the LED light engine 12 rapidly changes from red to green to blue and then back to red many times per second. When the DMD 18 receives this stream of rapidly changing colored light 14, the micromirrors on the DMD 18 are directed rapidly turn on or off to create the video images. In one embodiment, this direction is provided by the processor 20. This rapid turning on and off of the micromirrors is coordinated to match the sequence of colors in the colored light 14. For example, when the colored light 14 is red, the micromirrors turn on or off as appropriate to generate the shades of red for a particular frame of video. Specifically, one micromirror may turn on for 25 microseconds to contribute one shade of red to its associated pixel while another one of the micromirrors may turn on for 30 microseconds to contribute another shade of red to a different pixel while still another micromirror may turn off completely for some period of time if no red light is to be projected to a particular one of the pixels during a particular frame. In a similar fashion, the micromirrors generate shades of green and blue, if needed, when the colored light 14 is green or blue, respectively. Those skilled in the art will appreciate that in alternate embodiments other colors of light may be employed besides or in addition to red, green, and blue.

Because these different colors of light are rapidly changing (e.g. 30 times per second), the viewer sees a cohesive image formed from the three colors of light on the screen 28. For example, to create a particular shade for a particular pixel, the micromirror corresponding to that particular pixel may turn on for 20 microseconds of red light, 22 microseconds of green light, and 17 microseconds of blue light. Alternately, the micromirror may turn on for 20 microseconds of red light and 20 microseconds of blue light, but remain turned off for green light. Those skilled in the art will appreciate that millions of color combinations can be projected by varying the lengths of time that the micromirrors are turned on.

The video unit 10 may also comprise the projection lens 26 to project the light reflected from the DMD 18 onto the screen 28. In one embodiment, the projecting lens 26 facilitates the projection of turned-on light 24 by expanding the turned-on light 24 to cover the relatively large area of the screen 28. In an alternate embodiment, the screen 28 may not be a part of the video unit 10. For example, the screen 28 may be mounted on a wall and the video unit 10 may comprise a projector configured to project video across a room to the screen 28.

Figure 2:
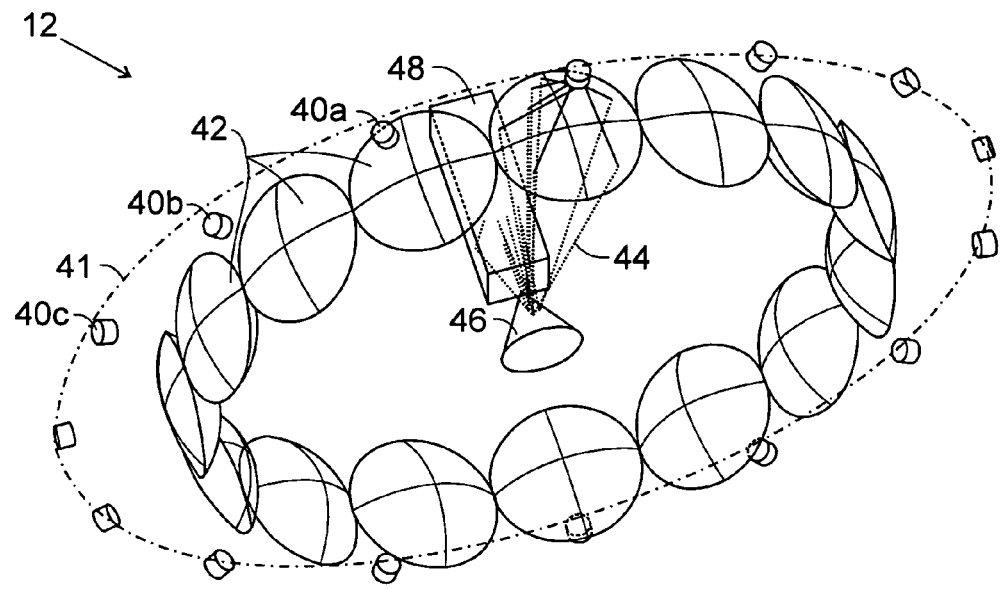
FIG. 2 is a diagram of one embodiment of the LED light engine comprising an LED ring and a static reflector in accordance with embodiments of the present invention.

FIG. 2 is a diagram of one embodiment of the LED light engine 12 comprising an LED ring 41 and a static reflector 46 in accordance with embodiments of the present invention. As illustrated, the LED light engine 12 is comprised of a plurality of LEDs 40a, 40b, and 40c oriented in an angular configuration to form the LED ring 41. The embodiment illustrated in FIG. 2 comprises 15 LEDs 40a, 40b, and 40c. While only three of the LEDs 40a, 40b, and 40c are specifically labeled in FIG. 2, it will be appreciated that the discussion below may refer to all of the LEDs in the LED ring 41. Alternate embodiments of the LED ring 41 may comprise either more LEDs 40a, 40b, and 40c or less LEDs 40a, 40b, and 40c depending on the design of the video unit 10. Moreover, those skilled in the art will appreciate that the LED ring 41 is merely one exemplary configuration of LEDs in the LED light engine 12. In alternate embodiments, other configurations besides the LED ring 41 may be employed with the LED light engine 12.

Each of the LEDs 40a, 40b, and 40c may comprise any one of a number of standard, projection quality LEDs, as known to those of ordinary skill in the art. In one embodiment, the LEDs 40a, 40b, and 40c may comprise a variety of different colors of LED 40a, 40b, and 40c. For example, the embodiment illustrated in FIG. 2 comprises five red LEDs 40a, five green LEDs 40b, and five blue LEDs 40c. In alternate embodiments, different colored LEDs 40a, 40b, and 40c may be used.

The LED light engine 12 may also comprise a static reflector 46. In the embodiment illustrated in FIG. 2, the static reflector 46 is a conical prism. In alternate embodiments, different forms of reflectors, optics, or prisms may be employed to reflect light 44 from the LEDs 40a, 40b, and 40c in the manner described below.

The LED light engine 12 may also comprise a plurality of lenses 42. In the illustrated embodiment, the lenses 42 are arrayed in an annular configuration between each of the LEDs 40a, 40b and 40c in the LED ring 41 and the static reflector 46. Each of the lenses 42 is configured to focus light from one of the LEDs 40a, 40b, and 40c at the static reflector 46. For example, each of the lenses 42 may be configured such that one of the LEDs 40a, 40b, and 40c is at a focal point on one side of the lens 42 and the static reflector 46 is at the focal point on the other side of the lens 42. Those of ordinary skill in the art will appreciate that the location and configuration of the plurality of lenses 42 and the static reflector 46 may be altered to accommodate design considerations of various systems, such as the locations of the LEDs 40a, 40b, and 40c.

The LED light engine 12 may also comprise an integrator 48, which is also referred to as a light tunnel. The integrator 48 is configured to spread out, focus, or align the light generated by the LEDs 40a, 40b, and 40c to evenly reflect off the DMD 18 (FIG. 1).

In turning to operation of the LED light engine 12, when the LEDs 40a, 40b, and 40c emit the light 44, the lenses 42 focus the light 44 at the static reflector 46. Most of the light 44 is reflected off the static reflector 46 into the integrator 48. The light 44 that enters the integrator 48 is spread out, focused or aligned, as appropriate, to create the colored light 14. Those skilled in the art will appreciate that from the perspective of the integrator 48, all of the light 44 that enters the integrator 48 appears to be being generated at a point directly below or behind the static reflector 46. In other words, the static reflector 46 combines the light produced by the LEDs 40a, 40b and 40c (and focused by the lenses 42) into what appears from the integrator's 48 perspective to be a single light source that is produces as much a light as multiple LEDs 40a, 40b, and 40c from the LED ring 41.

Those skilled in the art will appreciate that different colors of the LED 40a, 40b, and 40c may be used to produce the alternating red, green, and blue light that typically comprises the colored light 14. As described above in the embodiment illustrated in FIG. 2, five of the fifteen LEDs 40a, 40b and 40c may be red LEDs 40a, five of the fifteen LEDs 40a, 40b, and 40c may be green LEDs 40b, and five of the fifteen LEDs 40a, 40b, and 40c may be blue LEDs 40c. In this embodiment, to create the colored light 14 that alternates from red to green to blue, the red LEDs are turned on momentarily (flashed) then the green LEDs are flashed, then the blue LEDs are flashed, then the red LEDs are flashed, and so forth. In this embodiment, the LEDs 40a, 40b, and 40c alternate in color red, green, and blue around the LED ring 41. In alternate embodiments, the color distribution of the LEDs 40a, 40b, and 40c may differ depending upon design considerations. For example, in one embodiment, there may be fewer green LEDs 40b in the LED ring 41 because green light has higher luminance than red light or blue light.

As described above, single conventional LEDs 40a, 40b, and 40c cannot be used to project large video images because a single conventional LEDs 40a, 40b, and 40c do not typically produce enough light to project a large, continual video image. One of ordinary skill in the art, however, will appreciate that the light output from one of the LEDs 40a, 40b, and 40c is generally inversely proportional to the ratio of the time that the LED 40a, 40b, and 40c is turned on versus the time that the LED 40a, 40b, and 40c is turned off. This ratio is known as the duty cycle. For example, conventional LED-based projection systems comprise one red LED 40a, one green LED 40b, and one blue LED 40c. To create a sequence of colored light each of these LEDs is turned on for one third of the time (i.e., the red LED flashes red, then the green LED flashes green, then the blue LED flashes blue, then the red LED flashes red again, and so on). For this reason, each of these LEDs is deemed to have a ⅓ duty cycle. Operating with a ⅓ duty cycle, single conventional LEDs simply do not typically produce enough light to project a large video image.

However, if the duty cycle of the LED is decreased (i.e., the LED has more time to "rest" between flashes), a single individual LED can produce enough light to project a large video image. In one embodiment, a duty cycle of less than ⅓ is employed. For example, with a duty cycle of 1/15 (i.e., turned on approximately 6.5% of the time), a single LED can project a large video image. Those skilled in the art, however, will appreciate that with a duty cycle of 1/15, it takes approximately 15 LEDs to produce a continuous video image.

Figure 3:
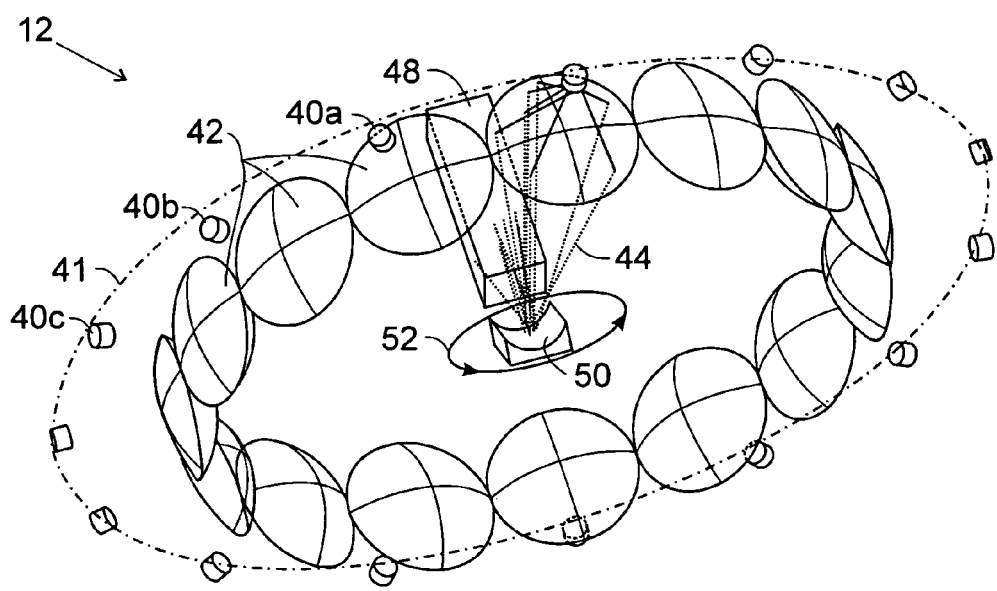
FIG. 3 is a diagram of another embodiment of the LED light engine comprising an LED ring and a rotating reflector in accordance with embodiments of the present invention.

FIG. 3 is a diagram of another embodiment of the LED light engine 12 comprising an LED ring 41 and a rotating reflector 50 in accordance with embodiments of the present invention. For simplicity, like reference numerals have been used to designate those features previously described in reference to FIG. 2. Similar to the embodiment of the LED light engine 12 illustrated in FIG. 2, the embodiment of the LED light engine 12 illustrated in FIG. 3 comprises a plurality of LEDs 40a, 40b, and 40c arranged in the LED ring 41 around a plurality of lenses 42, also arranged in a ring in the illustrated embodiment. This embodiment of the LED light engine 12 also comprises the integrator 48, as described above.

The embodiment illustrated in FIG. 3 comprises a rotating reflector 50 that rotates in a clockwise direction 52. In one embodiment, the rotating reflector 50 comprises a parabolic mirror. Whereas the static reflector 46 is placed at a location within the LED light engine 12 that is amenable to simultaneously reflecting light from all of the LEDs 40a, 40b, and 40c, the rotating reflector 50 is configured to sequentially focus the light from each particular one of the LEDs 40a, 40b, and 40c in the LED ring 41 as the rotating reflector 50 rotates in the counter clockwise direction 52.

By synchronizing the rotation of the rotating reflector 50 with the highly bright (low duty cycle) flashes of the LEDs 40a, 40b, and 40c, sufficient light is reflected from the LEDs 40a, 40b, and 40c to project a large continuous video image. For example, the rotating reflector 50 may begin facing a first red LED 40a. While the rotating reflector 50 is pointed at the first red LED 40a, the first red LED 40a will produce a flash of red light bright enough to project the video image. Most of this red light will reflect off the rotating reflector 50 and into the integrator 48. The rotating reflector 50 will then rotate to face the first green LED 40b and reflect the green light produced by the first green LED 40b. Next, the rotating reflecting will rotate to face the first blue LED 40c and so forth around the LED ring 41. Those skilled in the art will appreciate that from the perspective of the integrator 48, there will appear to be a single light source producing a sequence of red, green, and blue light with sufficient brightness to project a large video image.

Figure 4:
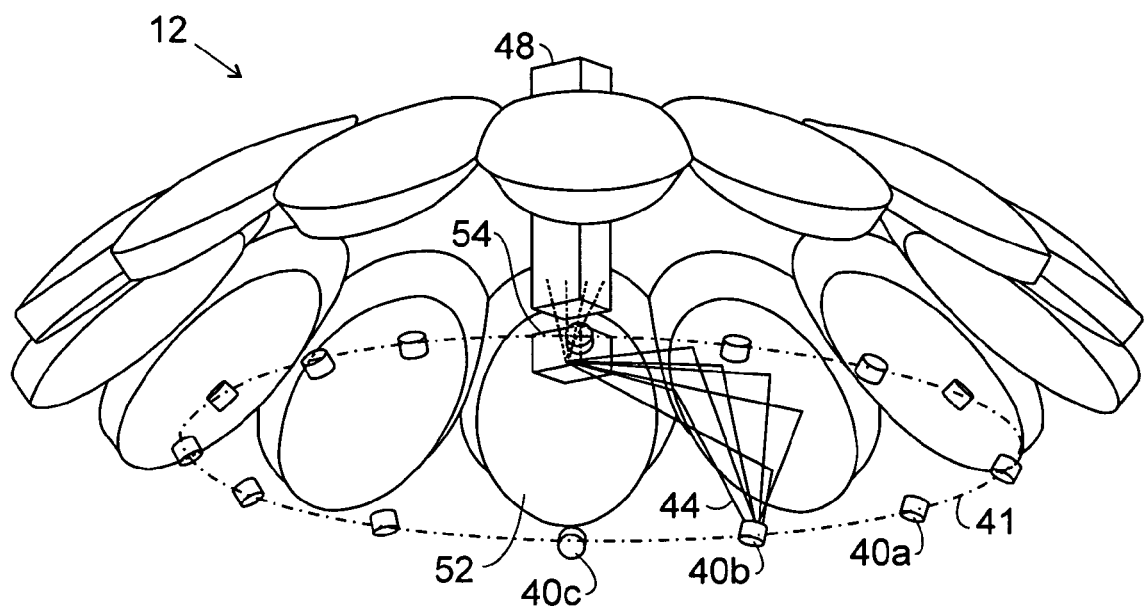
FIG. 4 is a diagram of another embodiment of the LED light engine comprising an LED ring and an ellipsoidal reflector in accordance with embodiments of the present invention.

FIG. 4 is a diagram of another embodiment of the LED light engine 12 comprising an LED ring and an ellipsoidal reflector 52 in accordance with embodiments of the present invention. For simplicity, like reference numerals have been used to designate those features previously described in reference to FIGS. 2 and 3. The embodiment of the LED light engine 12 illustrated in FIG. 4 comprises the LEDs 40a, 40b, and 40c disposed in the LED ring 41, a plurality of ellipsoidal reflectors 52, a reflector 54, and the integrator 48.

Each of the LEDs 40a, 40b, and 40c is configured to produce the light 44 which reflects off the ellipsoidal reflectors 52 towards the reflector 54. Those skilled in the art will appreciate that the ellipsoidal reflectors 52 have two focal points. In one embodiment, as illustrated, the LEDs 40a, 40b, and 40c will be placed at one of the focal points and the reflector 54 will be placed at the other focal point. The ellipsoidal reflectors 52 may achieve a result similar to the lenses 42 that were described above. In one embodiment, the ellipsoidal reflectors 52 are comprised of a plastic shell with a reflective paint or coating. In alternate embodiments, the ellipsoidal reflectors 52 may be constructed from any other suitable materials, as known to those of ordinary skill in the art.

The embodiment of the LED light engine 12 depicted in FIG. 4 may function similarly to either the embodiment depicted in FIG. 2 or the embodiment depicted in FIG. 3. Specifically, in one embodiment, the reflector 54 comprises a stationary reflector and the LEDs 40a, 40b, and 40c are configured to operate in combination to produce enough light to project a large video image, as described in relation to FIG. 2. In another embodiment, however, the reflector 54 comprises a rotating reflector and the LEDs 40a, 40b, and 40c are configured to operate with a lower duty cycle (e.g., 1/15). In this embodiment, each individual LED 40a, 40b, and 40c is configured to produce enough light to project a large video image, as outline above in regard to FIG. 3.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A video unit comprising:
a plurality of light emitting diodes disposed in a first annular formation and configured to produce light, wherein the plurality of light emitting diodes comprise red light emitting diodes, green light emitting diodes, and blue light emitting diodes, wherein the individual light emitting diodes of the plurality of light emitting diodes alternate in color around the first annular formation;
a reflector configured to reflect the produced light from at least one of the plurality of light emitting diodes; and
a plurality of optical components disposed in a second annular formation separate from the first annular formation and concentric to the first annular formation, wherein each of the optical components corresponds to one of the light emitting diodes, wherein each of the optical components is configured to focus the produced light at the reflector.

2. The video unit of claim 1, wherein the reflector is configured to simultaneously reflect light from multiple light emitting diodes.

3. The video unit of claim 1, wherein the plurality of light emitting diodes in conjunction with the reflector are configured to simultaneously produce a single color of light.

4. The video unit of claim 1, wherein the reflector comprises a rotating reflector configured to rotate relative to the plurality of optical components, and wherein the plurality of light emitting diodes is configured to operate with a duty cycle of less than 33 percent.

5. The video unit of claim 1, wherein the reflector comprises a conical prism.

6. The video unit of claim 1, wherein the plurality of optical components comprise a plurality of ellipsoidal reflectors.

7. The video unit of claim 1, wherein the plurality of optical components comprise a plurality of lenses.

8. The video unit of claim 1, comprising a digital micromirror device, wherein the digital micromirror device is configured to project an image using the reflected light.

9. A method of projecting video on a screen, the method comprising:
producing light from at least one of a plurality of light emitting diodes disposed in a first annular formation, wherein the plurality of light emitting diodes comprise red light emitting diodes, green light emitting diodes, and blue light emitting diodes, and wherein the individual light emitting diodes of the plurality of light emitting diodes alternate in color around the first annular formation;
focusing the produced light on a reflector by directing the produced light from at least one of the plurality of light emitting diodes through a plurality of optical components disposed in a second annular formation concentric to the first annular formation, wherein each of the plurality of optical components corresponds to one of the plurality of light emitting diodes;
reflecting the produced light into an integrator; and
projecting the produced light onto a screen.

10. The method of claim 9, wherein producing light comprises simultaneously producing light from a plurality of light emitting diodes.

11. The method of claim 10, wherein simultaneously producing light from a plurality of light emitting diodes comprises simultaneously producing a single color of light from the plurality of light emitting diodes and the reflector.

12. The method of claim 9, wherein focusing the produced light on the reflector comprises focusing the produced light on a rotating reflector configured to rotate relative to the plurality of optical components.

13. The method of claim 9, wherein producing light comprises producing light from LEDs operating at a duty cycle of less than 33 percent.

14. The method of claim 9, wherein focusing the produced light on a reflector comprises focusing the produced light through a lens.

15. The method of claim 9, comprising projecting a video image using the reflected light.

16. A video unit comprising:
means for producing light from at least one of a plurality of light emitting diodes disposed in a first annular formation, wherein the plurality of light emitting diodes comprise red light emitting diodes, green light emitting diodes, and blue light emitting diodes, wherein the individual light emitting diodes of the plurality of light emitting diodes alternate in color around the first annular formation;
means for focusing the produced light on a reflector by directing the produced light from at least one of the plurality of light emitting diodes through a plurality of optical components disposed in a second annular formation concentric to the first annular formation, wherein each of the plurality of optical components corresponds to one of the plurality of light emitting diodes; and
means for reflecting the produced light into an integrator.

17. The video unit of claim 16, wherein the means for producing light and the means for focusing the produced light are configured to simultaneously produce a single color of light from the plurality of light emitting diodes.

18. The video unit of claim 16, wherein the means for focusing the produced light comprises a rotating reflector configured to rotate relative to the plurality of optical components.

19. The video unit of claim 16, wherein the means for producing light comprises a plurality of light emitting diodes configured to operate at a duty cycle of less than 33 percent.

20. The video unit of claim 1, comprising a liquid crystal display.

21. The video unit of claim 16, comprising a liquid crystal display.

22. The method of claim 9, comprising focusing the produced light on a single, common reflector.

23. The video unit of claim 16, comprising a means for focusing the produced light on a single, common reflector.

* * * * *